Figure 1:
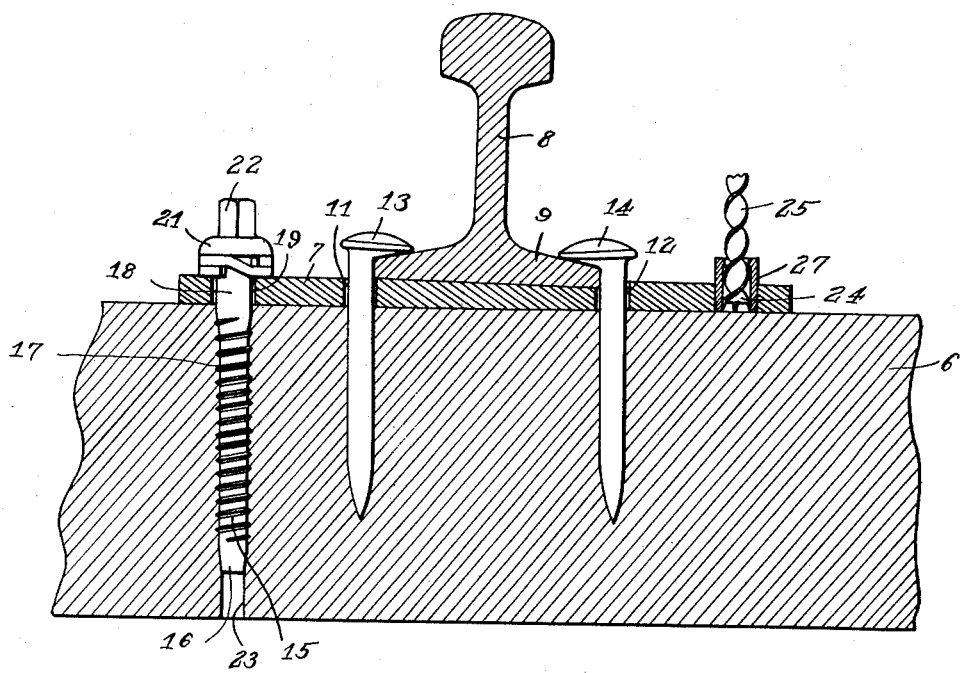

June 12, 1934.   A. H. HAWKINSON   1,962,241
BORING TOOL
Filed Oct. 12, 1932

Inventor.
Adolph H. Hawkinson
By Wilson, Dowell,
McCanna & Rehm
Attys.

Patented June 12, 1934

1,962,241

UNITED STATES PATENT OFFICE 1,962,241

BORING TOOL

Adolph H. Hawkinson, Rockford, Ill., assignor to Greenlee Bros. & Co., Rockford, Ill., a corporation of Illinois Application October 12, 1932, Serial No. 637,475

6 Claims. (Cl. 145—116)

This invention relates to boring tools and has special reference to a bit particularly adapted for the purpose of boring holes in ties for the purpose of affixing tie plates thereto.

In certain types of railway construction it is necessary to secure the tie plates to the ties, which is done by means of screw spikes located adjacent to each corner of the plate, that is, four screw spikes are inserted, one at each corner of the plate and pass through openings in the plate. Because the rail is located in a fixed position on the plate it is necessary that the holes for the screw spikes be bored so as to accurately position the tie plate to insure the proper track gauge. It is common in this type of construction to lay the track and gauge the distance between the tracks before boring the spike holes. The spike holes are then bored through the openings in the tie plate with the tie plate in position. This is commonly done with an electric or pneumatic drill fitted with a suitable wood-boring bit. However, in such operations numerous difficulties are encountered. Chief among these are the fact that the drill is a rather heavy and bulky instrument and it is consequently difficult for the operator to accurately position the bit in the tie plate opening and in so doing frequently strikes the iron tie plate with the point of the bit which causes the tool to be rapidly dulled and damaged. Furthermore, even though the operator succeeds in inserting the bit through the opening it is still difficult for him to center the bit exactly in the center of the opening. As a consequence the bored hole is frequently off-center so that when the screw spike is inserted and drawn down the tie plate will be moved by the insertion of the spike, thus altering the gauge of the tracks. Under these circumstances, there is the further difficulty of having the side of the bit strike the sides of the opening in the tie plate, thus damaging the bit. Occasionally the hole in the tie is drilled so far off-center that the shoulders on the screw spike abut, upon insertion, against the plate, with such firmness as to prevent the complete insertion of the spike.

I have, therefore, aimed to provide an improved boring tool having means for centering the tool in the opening of the tie plate.

Another object of the invention is the provision of a boring tool for boring a hole in the bottom of a surface opening having means for centering and guiding the bit into the surface opening.

Another object of the invention is the provision of a boring tool for boring holes in a tie through the opening of a tie plate wherein the tool is provided with means for preventing contact of the end and the side of the bit with the tie plate.

A further object of the invention is the provision of improved means for guiding the bit.

I have also aimed to provide a boring tool having a guiding bushing supported thereon for guiding the bit into a surface opening and centering the bit with respect thereto.

Other objects and attendant advantages will become apparent to those skilled in the art from the following description and the accompanying drawing, in which—

Figures 2, 3, 4:
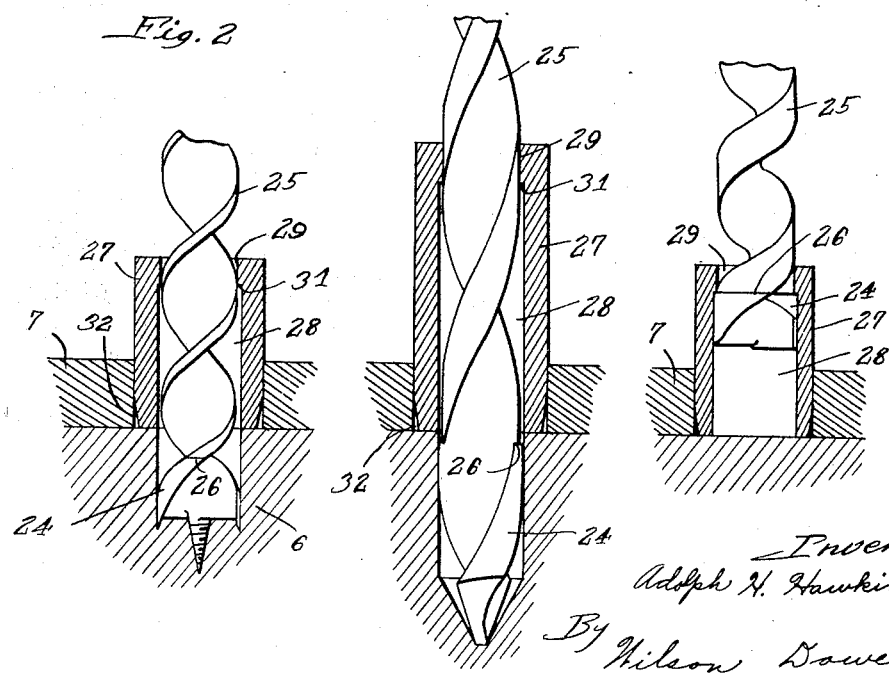

Figure 1 is a vertical section through a rail, a tie plate and a tie showing the manner of using my improved boring tool; and Figs. 2, 3 and 4 are fragmentary sections through a tie plate and the guide bushing showing the application of the invention to different types of bits.

Referring first to Figure 1—the numeral 6 designates a portion of a railway tie to which a tie plate 7 is to be affixed. The tie plate is adapted to support a rail designated generally by the numeral 8 having a flanged base 9. The tie plate is provided with openings 11 and 12 for the reception of conventional spikes 13 and 14 for the purpose of holding the base of the rail against the tie plate. The tie plate is secured to the tie 6 by means of screw spikes designated generally by the numeral 15. These spikes are provided with a tapered end portion 16, an intermediate portion provided with threads 17 and an upper end having a flared portion 18 of substantially the same size as openings 19 in the tie plate. A shoulder 21 is arranged to bear against the top of the tie plate when the screw spike is completely inserted. A squared head 22 serves to receive a wrench to screw the spike into the tie.

The boring tool of the present invention is particularly designed to bore openings 23 in the tie for the reception of the screw spike 15. In Figure 1, the tool is shown in position to start the boring operations to bore the holes 23.

Referring now to Figs. 2–4, inclusive, wherein enlarged views of the invention are shown, Fig. 2 shows the invention as applied to a double twist auger bit commonly used on hard wood, Fig. 3 shows the invention as applied to a taper head drill commonly used for rapid drilling, and Fig. 4 shows the invention as applied to a ship's auger commonly used for boring southern pine. The invention consists in providing a bit of two diameters designated generally by the numerals 24 and 25, the portion 24 being of a larger diameter than 25, the junction of the two portions providing a shoulder 26. A cylindrical guide bushing designated generally by the numeral 27 is positioned on the bit and is provided with a counter-bore 28 and a bore 29, the counter-bore 28 being of such diameter as to receive the portion 24 of the bit, and the bore 29 being of such diameter as to receive the portion 25 of the bit but to prevent the passage of the portion 24, the shoulder 31 between the bore and the counter-bore being adapted to bear against the shoulder 26 on the bit to prevent the bushing from falling off the end of the bit and to support the bushing in a position to guard and guide the end of the bit. The bushing 27 is preferably of such size as to be received in the openings 19 of the tie plate within relatively close limits and is provided at its lower end with a bevel 32 for the purpose of facilitating the insertion of the bushing into the openings 19 of the tie plate.

The bit is, of course, supported in and driven from a pneumatic or electric drill as previously explained, which forms no part of the present invention and consequently is not shown. In use, the bit and bushing will commonly occupy the position shown in Fig. 4 as it is brought into the boring position. The pneumatic or electric drill is commonly rather large and bulky and it is, therefore, difficult to insert the point of the drill directly in the opening 19 and insure that the point of the drill is correctly positioned within this opening. However, with the present device the end of the boring tool is moved toward the opening 19. If the workman does not hit the opening concentrically the bushing will merely touch upon the upper surface of the tie plate and can be moved over the surface of the plate until it drops into the opening 19. Thereupon the bit may be lowered until the bushing drops down into contact with the tie. Further downward movement of the bit will bring the end of the bit in contact with the tie in a boring position, whereupon the power may be applied and the drilling operation carried on until an opening of the proper depth has been made.

It will be seen from this brief description of the operation that the bushing serves three distinct functions. First, upon lowering the bit into the boring position if the workman has not succeeded in accurately directing the end of the bit, the bushing will first come in contact with the top of the plate, thereby warning him and permitting him to move the end of the bit and bushing until the bushing does actually enter the opening 19 of the tie plate. He may then lower the bit into its proper position and the bushing will serve to guide this movement of the bit so that the bit will be accurately positioned within the opening. This positioning of the bit is a second function of the bushing. Thirdly, the position of the bushing serves as an indication to the operator as to the direction of the bore and serves to prevent the sides of the bit from coming in contact with the edges of the opening 19 of the tie plate during the boring operations. The present invention, therefore, serves to materially lengthen the life of the bit and facilitates the performance of a better boring operation.

While I have thus described and illustrated a specific embodiment of my invention I am aware that numerous alterations and changes may be made therein without materially departing from the spirit of the invention or the scope of the appended claims, in which—

I claim:

1. A boring tool comprising a bit having an enlarged cutting head, and a sleeve carried by and slidable on said bit arranged to bear against said enlarged head to enclose and protect the same, the bit moving through the sleeve as boring proceeds.

2. A boring tool comprising a bit having a cutting head and a circumferential shoulder adjacent thereto of the same diameter as said cutting head, a sleeve on said bit having a shoulder complemental to said first mentioned shoulder, said sleeve being arranged to enclose said head when said shoulders are in contact and being movable on the bit away from said head as boring proceeds.

3. A boring tool for boring in an object through an opening of a gauge plate comprising a bit having a twist and a cutting end at one end thereof, the cutting end of the twist being of greater diameter than the remainder thereof providing an annular shoulder, a sleeve slidable on the bit and having a bore of larger diameter for receiving the twist portion of larger diameter and a bore of smaller diameter for receiving the twist portion of smaller diameter, and an intermediate shoulder arranged to bear against the shoulder on the twist to limit the movement of the sleeve in one direction.

4. A boring tool for boring in an object through an opening of a gauge plate comprising a bit having a cutting end and a twist of stepped diameter greater at the cutting end, and a sleeve slidable on the twist having a shoulder for engaging the portion of greater diameter to limit movement of the sleeve in one direction to a point enclosing the cutting end.

5. A boring tool for boring in an object through an opening of a gauge plate comprising a bit having a cutting end and a twist, a sleeve slidable on the twist, and shoulders on the sleeve and on the twist for limiting movement of the sleeve in one direction to a point at which the sleeve projects beyond the cutting end and encloses the same.

6. A boring tool adapted for reception in a driving stock for boring in an object through the opening of a gauge plate comprising a bit having a cutting head, and means carried by the bit for centering the bit in said opening to bore a concentric hole.

ADOLPH H. HAWKINSON.